(12) United States Patent
Furihata et al.

(10) Patent No.: US 10,908,488 B2
(45) Date of Patent: Feb. 2, 2021

(54) IMAGE DISPLAY DEVICE AND METHOD OF CONTROLLING SAME

(71) Applicant: SEIKO EPSON CORPORATION, Tokyo (JP)

(72) Inventors: Takeshi Furihata, Okaya (JP); Daisuke Kasahara, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/225,815

(22) Filed: Dec. 19, 2018

(65) Prior Publication Data

US 2019/0187546 A1 Jun. 20, 2019

(30) Foreign Application Priority Data

Dec. 20, 2017 (JP) .................. 2017-243576

(51) Int. Cl.
*G03B 21/20* (2006.01)
*G03B 21/14* (2006.01)
(Continued)

(52) U.S. Cl.
CPC .......... *G03B 21/206* (2013.01); *G03B 21/14* (2013.01); *G06F 1/185* (2013.01); *G06F 1/26* (2013.01); *G06F 1/28* (2013.01); *G06F 1/30* (2013.01); *G06F 1/3265* (2013.01); *G06F 11/16* (2013.01); *G06F 11/20* (2013.01); *G06F 11/22* (2013.01); *G09G 3/006* (2013.01); *G09G 5/003* (2013.01); *H04N 5/44* (2013.01); *H04N 9/3141* (2013.01); *H04N 9/3194* (2013.01); *G09G 3/001* (2013.01); *G09G 2330/026* (2013.01); *G09G 2330/04* (2013.01); *G09G 2330/12* (2013.01);
(Continued)

(58) Field of Classification Search
CPC ....... G03B 21/206; G03B 21/14; G06F 1/185; G06F 1/3265; G06F 11/16; G06F 11/20; G06F 11/22; G09G 3/006; G09G 5/003
USPC .......................................................... 353/85
See application file for complete search history.

(56) References Cited

U.S. PATENT DOCUMENTS

2009/0207308 A1* 8/2009 Shoji ..................... G09G 5/006
348/554
2010/0306565 A1 12/2010 Umedu
(Continued)

FOREIGN PATENT DOCUMENTS

CN 104 461 799 B 11/2017
JP 2009-296404 A 12/2009
(Continued)

OTHER PUBLICATIONS

Machine Translation of JP 2017026756 (Year: 2019).*
(Continued)

*Primary Examiner* — Jerry L Brooks
(74) *Attorney, Agent, or Firm* — Oliff PLC

(57) ABSTRACT

An image display device adapted to display an image includes a connection section to which an interface board replaceable is connected, and which communicates with an external device via the interface board, a failure detection section adapted to detect a failure of the interface board connected to the connection section, and a control section adapted to limit power supply to the interface board in a case in which the failure detection section has detected the failure of the interface board.

7 Claims, 12 Drawing Sheets

(51) Int. Cl.
   *G06F 11/16*      (2006.01)
   *G06F 1/3234*     (2019.01)
   *G09G 3/00*       (2006.01)
   *G06F 1/26*       (2006.01)
   *H04N 9/31*       (2006.01)
   *H04N 5/44*       (2011.01)
   *G06F 11/20*      (2006.01)
   *G06F 1/30*       (2006.01)
   *G06F 11/22*      (2006.01)
   *G09G 5/00*       (2006.01)
   *G06F 1/28*       (2006.01)
   *G06F 1/18*       (2006.01)

(52) U.S. Cl.
   CPC ..... *G09G 2370/12* (2013.01); *G09G 2370/20* (2013.01); *G09G 2370/22* (2013.01)

(56) References Cited

U.S. PATENT DOCUMENTS

| | | |
|---|---|---|
| 2011/0296236 A1 | 12/2011 | Kawamoto et al. |
| 2013/0007326 A1* | 1/2013 | Fujii .................... G06F 13/24 710/267 |
| 2013/0162908 A1* | 6/2013 | Son ..................... H04N 5/14 348/571 |
| 2015/0093937 A1* | 4/2015 | Ghosh ................. H01R 31/065 439/620.21 |
| 2016/0266742 A1* | 9/2016 | Hussain .............. G06F 3/04842 |
| 2017/0083078 A1* | 3/2017 | Prathaban ............ G06F 1/3287 |
| 2018/0210783 A1* | 7/2018 | Sasahara ................ G06F 1/266 |

FOREIGN PATENT DOCUMENTS

| | | | | |
|---|---|---|---|---|
| JP | 2013143081 A | * | 7/2013 | .............. G06F 1/00 |
| JP | 5526649 B2 | | 6/2014 | |
| JP | 2017026756 A | * | 2/2017 | .............. G09G 5/00 |

OTHER PUBLICATIONS

Machine Translation of JP 2013143081 (Year: 2019).*
Nv, Barco, "ICMP Installation Manual", manualslib.com, Nov. 9, 2016, pp. 1-56, XP055583541, retrieved from the Internet: URL:https://www.manualslib.com/manual/1351326/Barco-Icmp.html, retrieved on Apr. 25, 2019.
Anonymous, "PCI Express", Wikipedia, Dec. 27, 2012, pp. 1-19, XP055285391, retrieved from the Internet: URL:https://en.wikipedia.org/w/index.php?title=PCI_Express&oldid=529970301, retrieved on Jul. 1, 2016.
May 7, 2019 Partial Search Report issued in European Patent Application No. 18213934.5.
Sep. 23, 2019 Extended Search Report issued in European Patent Application No. 18213934.5.

* cited by examiner

IMAGE DISPLAY DEVICE AND METHOD OF CONTROLLING SAME

CROSS-REFERENCE

The entire disclosure of Japanese Patent Application No. 2017-243576, filed Dec. 20, 2017 is expressly incorporated by reference herein.

BACKGROUND

1. Technical Field

The present invention relates to an image display device for displaying an image, and a method of controlling the image display device.

2. Related Art

The image display device for displaying an image is provided with a variety of connection terminals (interfaces) to be connected to an external device (see e.g., JP-A-2009-296404). However, since the desired connection terminals are not provided in some cases due to restrictions of space and cost, or it is necessary to send the whole display device to repair in the case in which the connection terminals, peripheral circuits thereof and so on break down, the convenience of the user is damaged in some cases. Therefore, it is desirable to adopt the configuration allowing the user to add an interface board provided with desired connection terminals like an expansion slot in a personal computer.

However, if a configuration allowing the user to freely add the interface board is adopted, there is a possibility that a usage undesirable from a security viewpoint is made. For example, a malfunctioning interface board is connected, the connection is insufficient, or the connection operation is performed despite the device is in operation.

SUMMARY

An advantage of some aspects of the invention is to solve at least a part of the problems described above, and the invention can be implemented as the following forms or application examples.

Application Example 1

An image display device according to this present application example is adapted to display an image, and includes a connection section to which an interface board replaceable is connected, and which communicates with an external device via the interface board, a failure detection section adapted to detect a failure of the interface board connected to the connection section, and a control section adapted to limit power supply to the interface board in a case in which the failure detection section has detected the failure of the interface board.

According to the image display device, since the control section limits the power supply to the interface board in which the failure has been detected, it is possible to avoid continuing to supply the power to the interface board having an abnormality.

Application Example 2

In the image display device according to the above application example, it is desirable that in a state in which a first interface board as the interface board and a second interface board as the interface board are connected to the connection section, in a case in which the failure detection section has detected the failure in the first interface board but has not detected the failure in the second interface board, the control section limits the power supply to the first interface board but does not limit the power supply to the second interface board.

According to the image display device, in the case in which the failure has been detected only in the first interface board out of the first interface board and the second interface board, the control section limits only the power supply to the first interface board, but does not limit the power supply to the second interface board. Therefore, it is possible to avoid the case in which the failure in the first interface board makes the second interface board unavailable.

Application Example 3

In the image display device according to the above application example, it is desirable that the failure detection section detects a failure of a power supply of the interface board.

According to this image display device, since the failure detection section detects the failure of the power supply of the interface board, it is possible to avoid continuing to use the interface board having an abnormality in the power supply.

Application Example 4

In the image display device according to the above application example, it is desirable that the failure detection section detects a failure of communication of the interface board.

According to this image display device, since the failure detection section detects the failure of the communication of the interface board, it is possible to avoid the communication failure with other circuits in the image display device, and it becomes possible to continue the normal operations of other circuits.

Application Example 5

In the image display device according to the above application example, it is desirable to further include an announcing section adapted to announce that the failure detection section has detected a failure of the interface board in a case in which the failure detection section has detected the failure of the interface board.

According to this image display device, since there is provided the announcing section adapted to announce that the failure detection section has detected the failure of the interface board in the case in which the failure detection section has detected the failure of the interface board, it becomes possible to make the user recognize the fact that the failure has occurred.

Application Example 6

An image display device according to this application example is an image display device adapted to display an image, the image display device including a connection section to which an interface board replaceable is connected, and which communicates with an external device via the interface board, an attachment/detachment detection section adapted to detect at least one of connection of the interface board to the connection section while the image display device is in operation, and removal of the interface board from the connection section while the image display device is in operation, and a control section adapted to limit power supply to the interface board in a case in which the attachment/detachment detection section has detected at least one of the connection and the removal.

According to this image display device, in the case in which the interface board has been connected or removed despite the image display device is in operation, the supply of the power to the interface board is limited. Therefore, it is possible to avoid the case in which the interface board is used in the state in which the interface board has improperly been connected or removed.

Application Example 7

In the image display device according to the above application example, it is desirable that a first interface board as the interface board and a second interface board as the interface board can be connected to the connection section, and in a state in which the first interface board is connected to the connection section, in a case in which the connection of the second interface board has been detected by the attachment/detachment detection section while the image display device is in operation, the control section limits the power supply to the second interface board but does not limit the power supply to the first interface board.

According to this image display device, in the case in which the second interface board has been connected to the connection section despite the image display device is in operation, the control section limits the power supply to the second interface board but does not limit the power supply to the first interface board. Therefore, it is possible to prevent the first interface board from also becoming unavailable.

Application Example 8

In the image display device according to the above application example, it is desirable that in a state in which a first interface board as the interface board and a second interface board as the interface board are connected to the connection section, in a case in which the removal of the second interface board has been detected by the attachment/detachment detection section while the image display device is in operation, the control section limits the power supply to the second interface board but does not limit the power supply to the first interface board.

According to this image display device, in the case in which the second interface board has been removed from the connection section despite the image display device is in operation, the control section limits the power supply to the second interface board but does not limit the power supply to the first interface board. Therefore, it is possible to prevent the first interface board from also becoming unavailable.

Application Example 9

In the image display device according to the above application example, it is desirable to further include an announcing section adapted to announce that the attachment/detachment detection section has detected at least one of the connection and the removal in a case in which the attachment/detachment detection section has detected at least one of the connection and the removal.

According to this image display device, since there is provided the announcing section adapted to announce that the attachment/detachment detection section has detected at least one of the connection and the removal of the interface board in the case in which the attachment/detachment detection section has detected at least one of the connection and the removal of the interface board, it becomes possible to make the user recognize the fact that the connection and the removal of the interface board while the image display device is in operation are prohibited operations.

Application Example 10

A method of controlling an image display device according to this application example is a method of controlling an image display device to which an interface board replaceable is connected, and which communicates with an external device via the interface board, and the method includes detecting a failure of the interface board connected, and limiting power supply to the interface board in a case in which the failure of the interface board has been detected.

According to the method of controlling the image display device, since the power supply to the interface board in which the failure has been detected is limited, it is possible to avoid continuing to supply the power to the interface board having an abnormality.

Application Example 11

A method of controlling an image display device according to this application example is a method of controlling an image display device to which an interface board replaceable is connected, and which communicates with an external device via the interface board, and the method includes detecting at least one of connection and removal of the interface board while the image display device is in operation, and limiting power supply to the interface board in a case in which at least one of the connection and the removal has been detected.

According to this method of controlling the image display device, in the case in which the interface board has been connected or removed despite the image display device is in operation, the supply of the power to the interface board is limited. Therefore, it is possible to avoid the case in which the interface board is used in the state in which the interface board has improperly been connected or removed.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Hereinafter, a projector as an image display device will be described with reference to the accompanying drawings.

Figure 1:
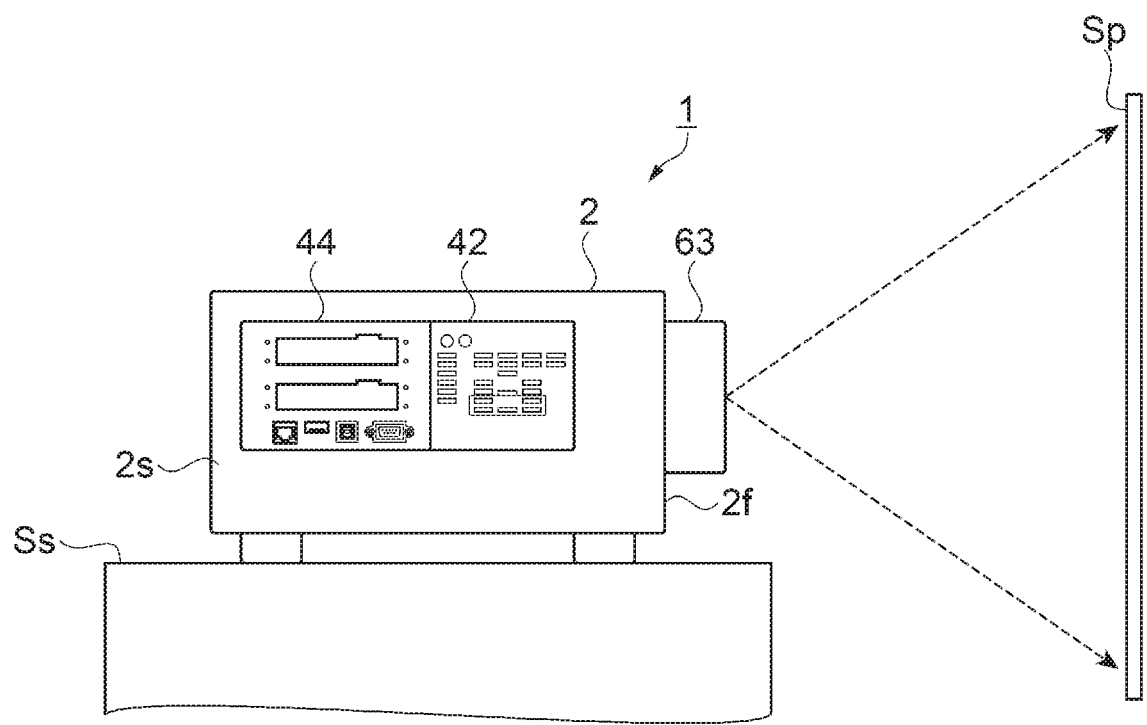
FIG. 1 is a side view showing a projector.
Figure 2:
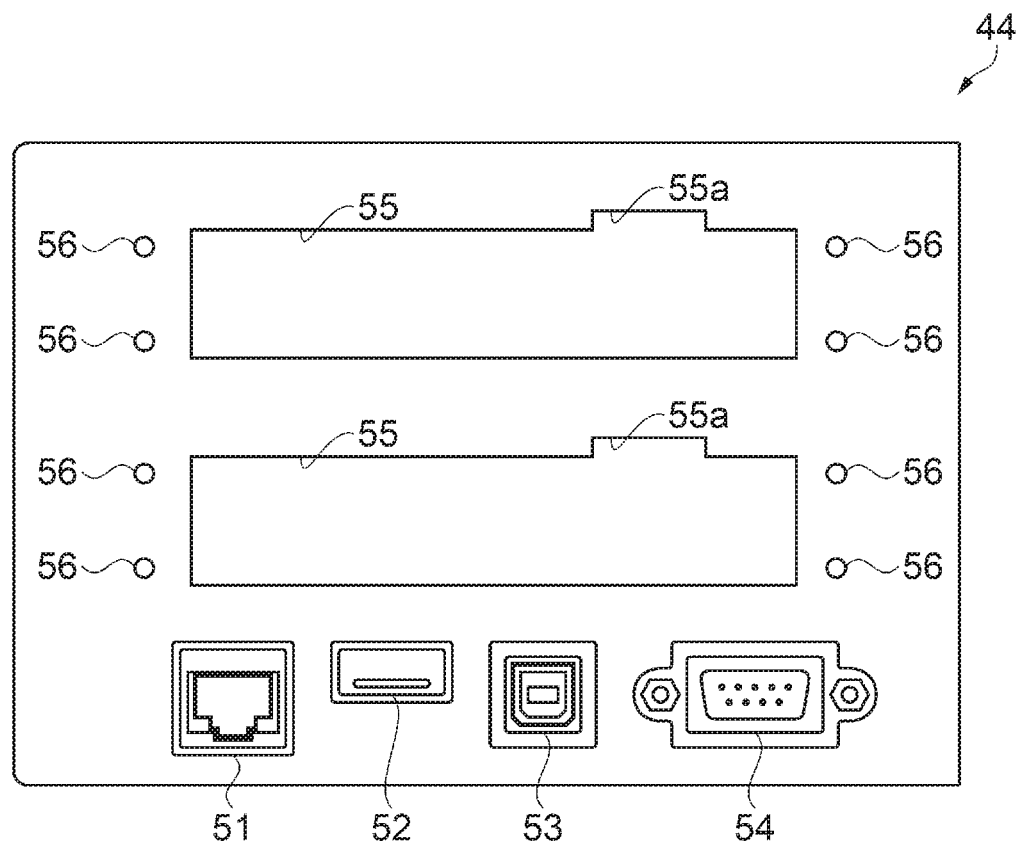
FIG. 2 is an enlarged view showing an interface panel in an enlarged manner.

FIG. 1 is a side view showing the projector 1 according to the present embodiment, and FIG. 2 is an enlarged view showing an interface panel 44 disposed on a side surface of the projector 1 in an enlarged manner.

As shown in FIG. 1, the projector 1 is used while being installed on an installation surface Ss to project an image on a projection surface Sp such as a screen or a wall surface. The projector 1 is provided with a housing 2 for housing a device main body, and on a front surface 2f of the housing 2, there is exposed a projection optical system 63 for projecting the image. On the side surface 2s of the housing 2, there are disposed an operation panel 42 in which an input operation is performed by the user, and the interface panel 44 to which an external device and so on are connected.

As shown in FIG. 2, the interface panel 44 is provided with a plurality of connection terminals to be connected to the external device. Specifically, the interface panel 44 is provided with a LAN (local area network) terminal 51 as the connection terminal to be connected to a network, USB (universal serial bus) terminals 52, 53 and an RS-232C terminal 54 as the connection terminals to which an external control device (e.g., a personal computer), peripheral equipment, and so on are connected. Further, the interface panel 44 is provided with two insertion slots (opening parts) 55 to which an interface board 10 (see FIG. 3 and FIG. 4) can be inserted, and two screw holes 56 are formed on both of the right and left sides of each of the insertion slots 55. The projector 1 receives supply of the image information from the external device via the interface board 10 inserted into the insertion slot 55 to project the image based on the image information.

Figure 3:
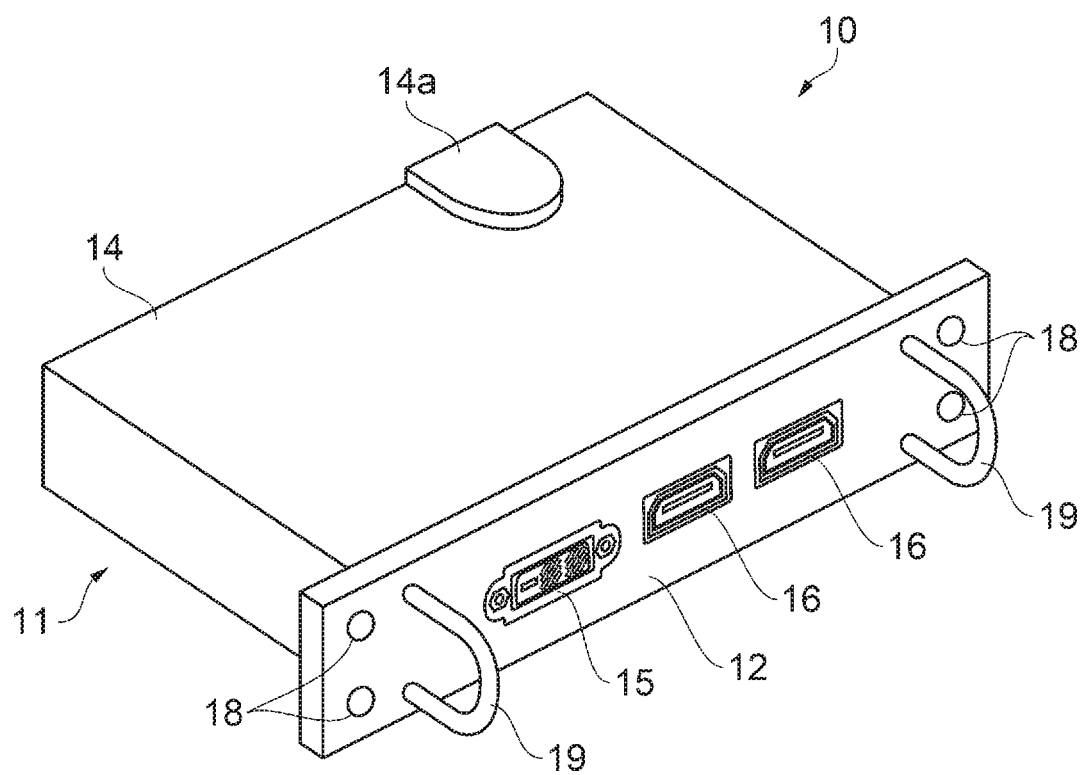
FIG. 3 is a perspective view showing an interface board.
Figure 4:
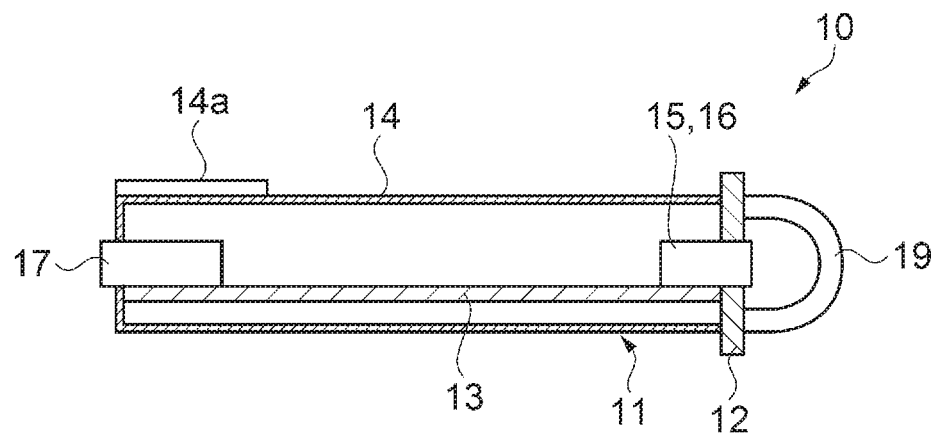
FIG. 4 is a side cross-sectional view of the interface board.
Figure 5:
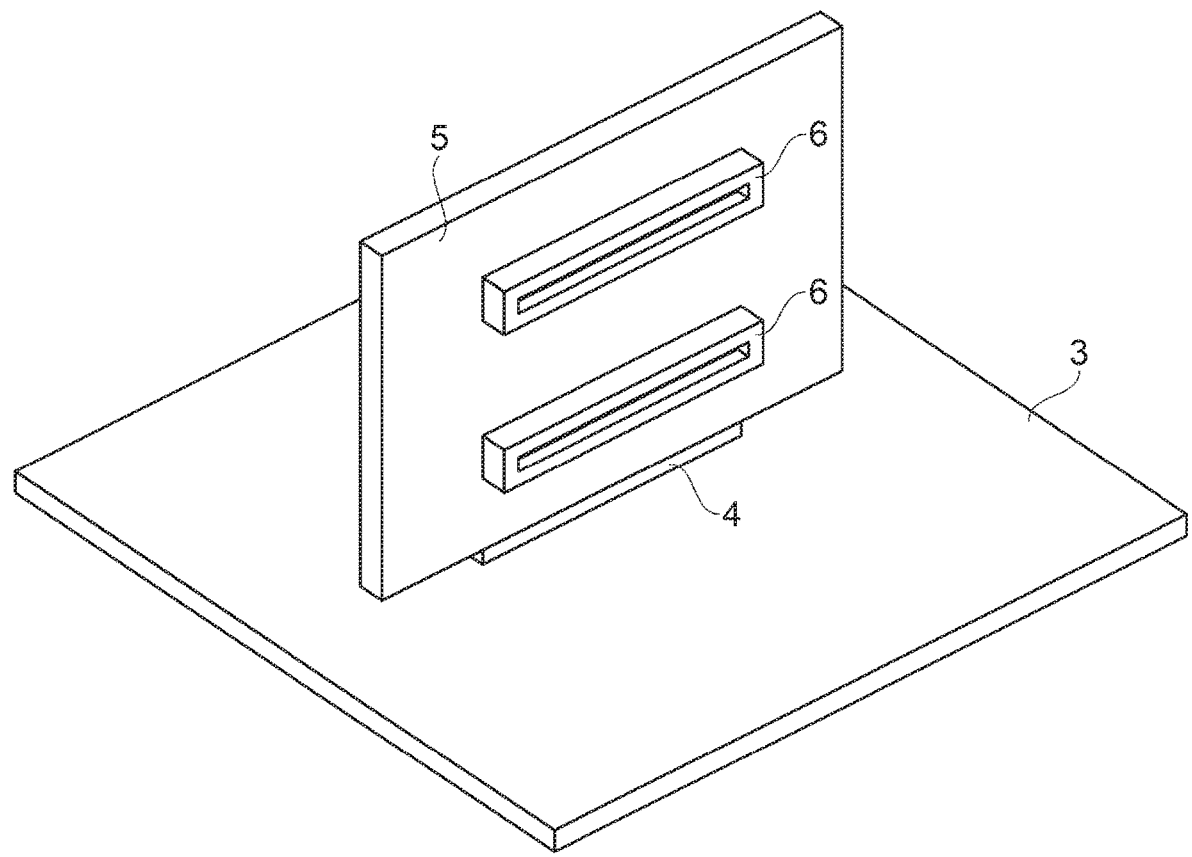
FIG. 5 is a perspective view showing a main board provided inside the projector.

FIG. 3 is a perspective view showing the interface board 10 to be inserted into the insertion slot 55, and FIG. 4 is a side cross-sectional view of the interface board 10. Further, FIG. 5 is a perspective view showing a main board 3 provided inside the projector 1. It should be noted that a variety of electronic components and so on mounted on the interface board 10 and the main board 3 are omitted from the drawings with some exceptions.

As shown in FIG. 3 and FIG. 4, the interface board 10 has a main body part 11 to be inserted into the inside of the projector 1 from the insertion slot 55, and a front panel 12 disposed so as to close the insertion slot 55 in the state in which the main body part 11 is inserted into the insertion slot 55. The front panel 12 is formed of a metal plate or the like, and is fixed to the main body part 11. The main body part 11 is configured including a circuit board 13 on which a variety of electronic components and so on are mounted, and a metal plate 14 formed so as to cover the circuit board 13 in order to protect the circuit board 13.

On an end part on the front side (the side to which the front panel 12 is fixed) of the circuit board 13, there are mounted connection terminals (hereinafter also referred to as "input terminals") to be connected to the external device to input the image information. In the example shown in FIG. 3 and FIG. 4, a DVI (digital visual interface) terminal 15, and two HDMI (registered trademark) (high definition multimedia interface) terminals 16 are mounted as input terminals on the circuit board 13 of the interface board 10, and these input terminals are exposed forward through opening parts provided to the front panel 12. Further, on an end part on the back side of the circuit board 13 (the opposite side to the front panel, namely the side of the direction in which the interface board 10 is inserted), there is mounted a connection terminal 17 to be connected to the main body of the projector 1.

On an upper surface of the metal plate 14 covering the circuit board 13 of the interface board 10, there is formed a protruding part 14a protruding upward. Further, as shown in FIG. 2, on the upper side of the peripheral part of the insertion slot 55, there is formed a recessed part 55a corresponding to the protruding part 14a, and in the case of inserting the interface board 10 into the insertion slot 55, the protruding part 14a of the metal plate 14 moves through the inside of the recessed part 55a of the insertion slot 55. In contrast, such a recessed part 55a is not formed on the lower side of the peripheral part of the insertion slot 55, therefore it is arranged that if the user tries to mistakenly insert the interface board 10 upside down, the protruding part 14a collides with the peripheral part of the insertion slot 55 to make it unachievable to insert the interface board 10.

As shown in FIG. 5, the main board 3 provided inside the projector 1 is a circuit board arranged to be parallel to the installation surface Ss in the state in which the projector 1 is installed on the installation surface Ss, and a number of electronic components and so on not shown are mounted on the main board 3. To the main board 3, there is connected a relay board 5 via a connection terminal 4, and the relay board 5 is arranged in a posture in which the relay board 5 is roughly parallel to the side surface 2s of the housing 2. On the relay board 5, two connection terminals 6 each connectable to the connection terminal 17 of the interface board 10 are arranged vertically side by side, and the connection terminal 17 of the interface board 10 inserted from the insertion slot 55 is connected to the connection terminal 6 on the relay board 5.

Going back to FIG. 3 and FIG. 4, in the vicinity of each of the right and left outer edges of the front panel 12, there are formed two through holes 18 corresponding to the screw holes 56 of the interface panel 44. The interface board 10 is screwed by the screws threaded through the through holes 18 after being inserted into the insertion slot 55 and the connection terminal 17 is connected to the connection terminal 6. Further, on each of the right and left sides of the front panel 12, a holding member 19 obtained by shaping a cylindrical rod made of metal into a U shape is fixed in the vicinity of the through holes 18. It is possible for the user to easily pull out the interface board 10 by catching the holding member 19 with fingers when removing the interface board 10 in the state of being inserted into the insertion slot 55 to be connected to the connection terminal 6.

As described above, since the projector 1 is configured so that the user can connect and remove the interface board 10, it is possible for the user to easily add or replace the interface board 10. Therefore, even in the case in which a desired input terminal is not provided to the projector 1, it becomes possible to input the image information using the desired input terminal by the user connecting the interface board 10 equipped with the input terminal to the projector 1.

Figure 6:
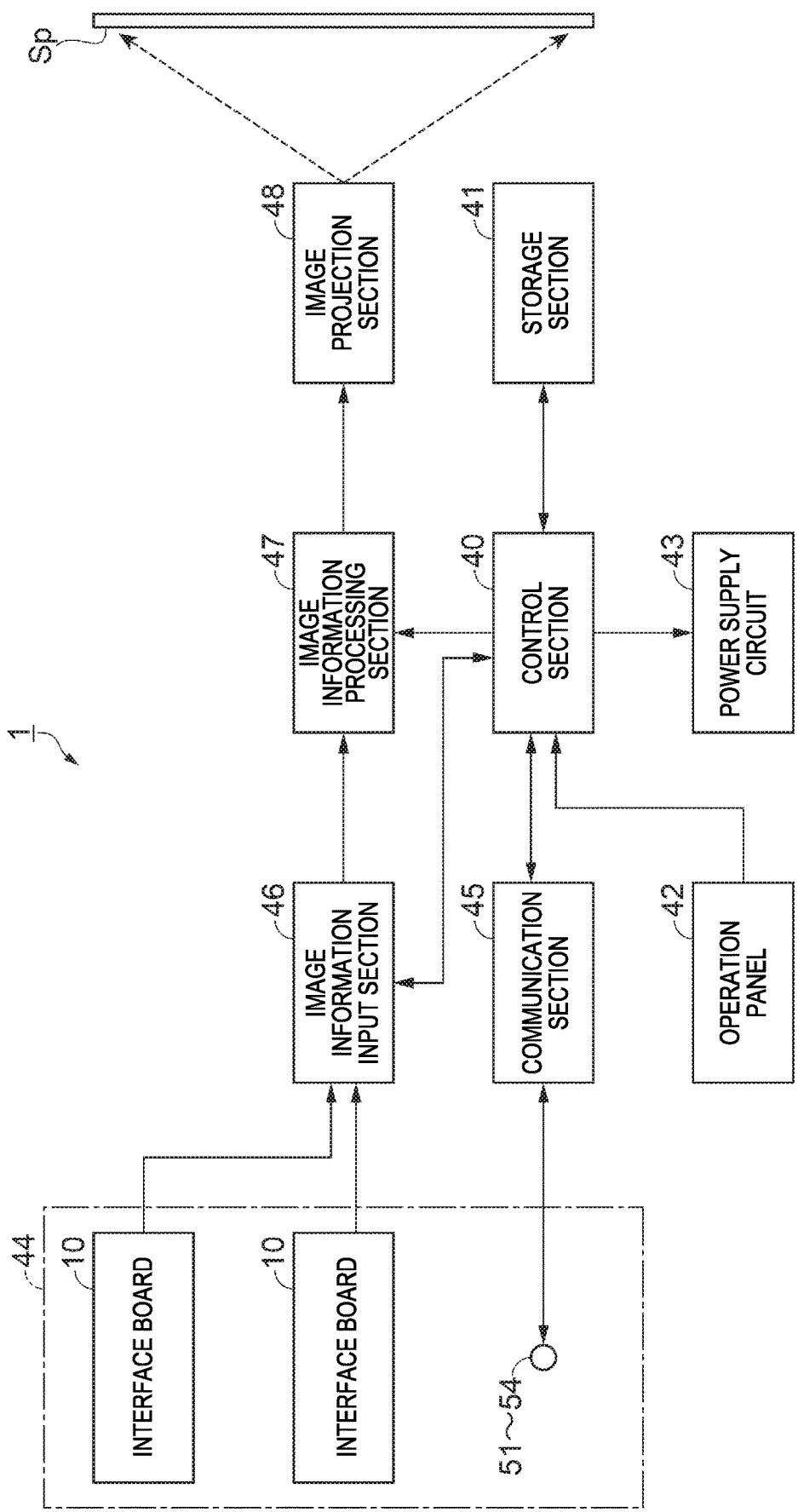
FIG. 6 is a block diagram showing a schematic configuration of the projector.
Figure 7:
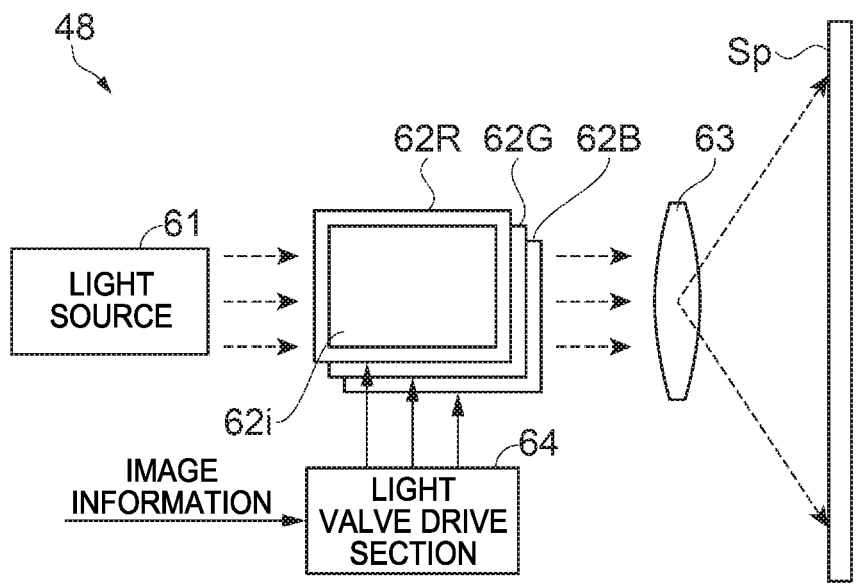
FIG. 7 is a block diagram showing a schematic configuration of an image projection section.

FIG. 6 is a block diagram showing a schematic configuration of the projector 1, and FIG. 7 is a block diagram showing a schematic configuration of an image projection section 48 provided to the projector 1.

As shown in FIG. 6, the projector 1 is configured integrally including a control section 40, a storage section 41, an operation panel 42 as an input operation section, a power supply circuit 43, the interface panel 44, a communication section 45, and an image information input section 46, an image information processing section 47 and the image projection section 48 as a display section. The projector 1 projects an image from the image projection section 48 on the projection surface Sp based on the image information input to the image information input section 46.

The control section 40 is configured including at least one processor, and operates in accordance with a control program stored in the storage section 41 to thereby integrally control the operation of the projector 1.

The storage section 41 is configured including memory devices such as a random access memory (RAM) and a read only memory (ROM). The RAM is used for temporary storage of a variety of types of data, and the ROM stores the control program, control data and so on for controlling the operation of the projector 1. Further, it is also possible for the storage section 41 to store the image information to be projected from the image projection section 48.

The operation panel 42 is provided with a plurality of operation keys for the user to provide a variety of instructions to the projector 1. As the operation keys provided to the operation panel 42, there are cited a "menu key" for displaying a menu image for setting the configuration, and an "input switching key" for switching the input terminal used for the projection besides a "power key" for switching between ON and OFF (standby) of the power. When the user operates a variety of operation keys of the operation panel 42, the operation panel 42 outputs an operation signal corresponding to the operation content by the user to the control section 40. It should be noted that it is also possible to adopt a configuration of using a remote controller (not shown) capable of a remote operation as the input operation section instead of the operation panel 42. In this case, the remote controller transmits an operation signal of an infrared ray corresponding to the operation content by the user, and then a remote control signal receiving section not shown receives the operation signal to transmit the operation signal to the control section 40.

The power supply circuit 43 is externally supplied with the commercial power (not shown) of 100 V AC or the like. The power supply circuit 43 converts the commercial power (alternating-current power) into direct-current power with a predetermined voltage to supply each section of the projector 1 with the electrical power (the supply path to each section will be omitted from the drawing). It should be noted that when the commercial power is supplied to the power supply circuit 43, the projector 1 makes the transition from the power OFF state to the standby state, and waits for the operation of the power key in the operation panel 42. Then, when the power key is operated by the user, the power is supplied to each section of the projector 1, and the projector 1 makes the transition from the standby state to the power ON state, and thus, turns to the state in which the projection of the image and a variety of operations can be achieved.

As described above, the interface panel 44 is provided with the two insertion slots 55 (see FIG. 2) to which the interface boards 10 are inserted, and at the same time, provided with the plurality of connection terminals 51 through 54 (the LAN terminal 51, the USB terminals 52, 53 and the RS-232C terminal 64) to be connected to the external device.

The communication section 45 is connected to the connection terminals 51 through 54 provided to the interface panel 44 to perform communication with the external devices (e.g., the network equipment, the computer, and a variety of types of peripheral equipment) not shown and connected to the connection terminals 51 through 54. It should be noted that although the communication section 45 mainly performs transmission and reception of the control information and so on, but it is also possible to arrange that the transmission and the reception of the image information are performed via the communication section 45.

The interface board 10 inserted into the insertion slot 55 of the interface panel 44 is connected to an external image supply device (not shown) such as a video reproduction device or a computer via the input terminal, and receives the supply of the image information from the image supply device. The interface board 10 converts the image information thus supplied into image information having a predetermined format, and then outputs the image information obtained by the conversion to the image information input section 46 from the connection terminal 17 (see FIG. 4). The interface board 10 of the present embodiment converts the image information supplied from the image supply device into the image information compliant with the TMDS (transition minimized differential signaling) transmission protocol, and then outputs the result to the image information input section 46 from the connection terminal 17. It should be noted that since the DVI standard and the HDMI standard are the standards adopting the TMDS transmission protocol as the transmission protocol, it is not substantively necessary to perform the conversion of the image information input to the DVI terminal 15 and the HDMI terminal 16 in the interface board 10 illustrated in FIG. 3 and FIG. 4, and conversion of a terminal arrangement and so on are performed.

To the image information input section 46, there are connected one or two interface boards 10, and the image information converted in the interface board 10, namely the image information compliant with the TMDS transmission protocol, is input via the connection terminal 6 (see FIG. 5). The image information thus input is output by the image information input section 46 to the image information processing section 47. Further, in the case in which the plurality of pieces of image information is input to the image information input section 46, the image information input section 46 selects at least one piece of image information from the plurality of pieces of image information thus input based on the control by the control section 40, and then outputs the image information thus selected to the image information processing section 47. Specifically, the image information input section 46 selects the image information input to the input terminal designated by an input switching key of the operation panel 42 to output the image information to the image information processing section 47.

Based on the control by the control section 40, the image information processing section 47 performs a variety of types of image processing on the image information input from the image information input section 46, and then outputs the image information having been processed to a light valve drive section 64 (see FIG. 7) of the image projection section 48. For example, the image information processing section 47 performs a process of adjusting the image quality such as brightness or contrast, a process of superimposing an OSD (on-screen display) image such as a menu image or a message image, and so on on the image information as needed.

It should be noted that the image information input section 46 and the image information processing section 47 can be constituted by one processor or a plurality of processors and so on, or can also be constituted by a dedicated processing device such as an ASIC (application specific integrated circuit) or an FPGA (field programmable gate array).

As shown in FIG. 7, the image projection section 48 is configured including a light source 61, three liquid crystal light valves 62R, 62G, and 62B as light modulation devices, a projection optical system 63, a light valve drive section 64, and so on. The image projection section 48 modulates the light emitted from the light source 61 with the liquid crystal light valves 62R, 62G, and 62B to thereby form image light, and then projects the image light from the projection optical system 63 constituted by a projection lens and so on to thereby display the image on the projection surface Sp.

The light source 61 is configured including a discharge type light source lamp such as a super high-pressure mercury lamp or a metal halide lamp, or a solid-state light source such as a light emitting diode or a semiconductor laser. The light emitted from the light source 61 is converted into the light having a substantially uniform intensity distribution by an integrator optical system not shown, and is then separated into colored light components of red (R), green (G), and blue (B), the three primary colors of light, by a color separation optical system not shown, and then the colored light components enter the liquid crystal light valves 62R, 62G, and 62B, respectively.

The liquid crystal light valves 62R, 62G, and 62B are each formed of a transmissive liquid crystal panel having a liquid crystal material encapsulated between a pair of transparent substrates, and so on. The liquid crystal panels are each provided with a rectangular image forming area 62i constituted by a plurality of pixels arranged in a matrix, and are each arranged so that a drive voltage can be applied to the liquid crystal material pixel by pixel.

The light valve drive section 64 forms an image in the image forming area 62i of each of the liquid crystal light valves 62R, 62G and 62B. Specifically, the light valve drive section 64 applies the drive voltages corresponding to the image information input from the image information processing section 47 to the respective pixels in the image forming area 62i to thereby set the pixels to respective light transmittances corresponding to the image information. The light emitted from the light source 61 is transmitted through the image forming area 62i of each of the liquid crystal light valves 62R, 62G and 62B to thereby be modulated pixel by pixel, and thus the image light corresponding to the image information is formed for each of the colored light beams. The image light beams of the respective colored light beams thus formed are combined pixel by pixel by a color composition optical system not shown to turn to the image light beam representing a color image, and are then projected on the projection surface Sp by the projection optical system 63 in an enlarged manner. As a result, on the projection surface Sp, there is displayed an image (the input image) based on the image information input to the image information input section 46.

Figure 8:
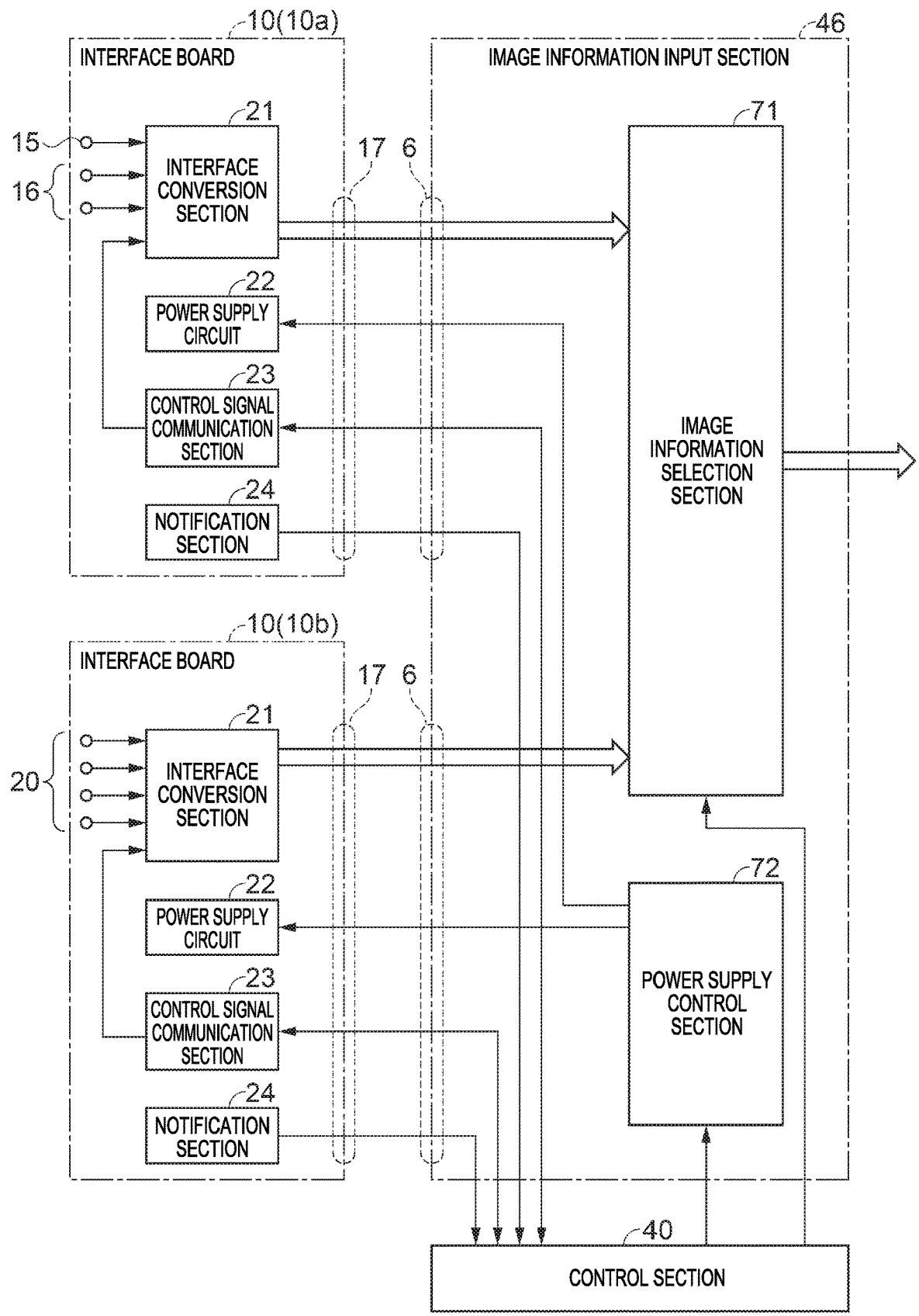
FIG. 8 is a block diagram showing internal configurations of an image information input section and the interface board of the projector.

FIG. 8 is a block diagram showing internal configurations of the image information input section 46 and the interface board 10 of the projector 1. It should be noted that in FIG. 8, there is shown a condition in which the two interface boards 10 (hereinafter also referred to as "interface boards 10a, 10b" in the case of distinguishing the two interface boards from each other) are connected to the image information input section 46. Similarly to the interface board 10 shown in FIG. 3, the interface board 10a, namely one of the interface boards 10, is provided with one DVI terminal 15 and two HDMI terminals 16 as the input terminals, and the interface board 10b, namely the other of the interface boards 10, is provided with four SDI (serial digital interface) terminals 20 as the input terminals.

As shown in FIG. 8, the interface boards 10 are each configured including an interface conversion section 21, a power supply circuit 22, a control signal communication section 23 and a notification section 24, and are each connected to the image information input section 46 via the connection terminals 17, 6.

The interface conversion section 21 performs a process of converting the image information input to the input terminals (the DVI terminal 15, the HDMI terminals 16 and the SDI terminals 20) into the image information compliant with the TMDS protocol. It should be noted that the substantive conversion process is not necessary for the image information input to the DVI terminal 15 and the HDMI terminals 16 as described above.

The power circuit 22 is supplied with the power from a power supply control section 72 of the image information input section 46, and supplies the power to each section of the interface board 10. Specifically, the power supply circuit 22 is supplied with the power of a high voltage (e.g., 17 V) from the power supply control section 72, and at the same time, generates the power of a low voltage (e.g., 3.3 V) from that power to supply the power thus generated to each section.

The control signal communication section 23 receives the control signal from the control section 40 of the projector 1 via the image information input section 46, and then outputs the control signal to the interface conversion section 21. Therefore, it is possible for the control section 40 of the projector 1 to control the conversion process by the interface conversion section 21 via the control signal communication section 23. Further, the control signal communication section 23 has a function of transmitting information (startup success information) representing the fact that the startup has normally been performed to the control section 40 of the projector 1 in the case in which the power supply from the projector 1 has started and the interface board 10 has normally started up. Further, the control signal communication section 23 has a function of transmitting information (communication success information) representing the fact that a predetermined control signal has normally been received to the control section 40 of the projector 1 in the case in which the predetermined control signal has been transmitted from the projector 1 to the control signal communication section 23.

Here, the case in which the projector 1 has normally started up denotes the case in which the voltage of the power supplied to the interface board 10 and the voltage of the power generated in the interface board 10 are maintained within a predetermined range. Therefore, it is possible for the control section 40 of the projector 1 to detect whether the power of the interface board 10 has normally risen or a failure occurs in the power of the interface board 10 based on presence or absence of the startup success information transmitted from the interface board 10. Further, it is possible for the control section 40 of the projector 1 to detect whether the communication with the interface board 10 can normally be performed or a failure occurs in the communication function of the interface board 10 based on presence or absence of the communication success information transmitted from the interface board 10.

The notification section 24 notifies the control section 40 of the projector 1 of connection information and type information via the image information input section 46. Specifically, the notification section 24 outputs a predetermined bit as the connection information to thereby notify the control section 40 of the fact that the interface board 10 is appropriately connected to the projector 1 (the connection terminal 6). Further, the notification section 24 outputs a bit string corresponding to the type of the interface board 10 as the type information to thereby notify the projector 1 of the type of the interface board 10. In other words, the interface board 10*a* and the interface board 10*b* output the bit strings different from each other as the type information. Here, the type of the interface board 10 is determined depending on, for example, the type and the number of the input terminals provided to the interface board 10. As described above, it is possible for the control section 40 of the projector 1 to determine the fact that the interface board 10 is appropriately connected, and the type of the interface board 10 thus connected based on the notification from the notification section 24.

It should be noted that the interface conversion section 21 and the control signal communication section 23 can be constituted by one processor or a plurality of processors and so on, or can also be constituted by a dedicated processing device such as an ASIC (application specific integrated circuit) or an FPGA (field programmable gate array).

The image information input section 46 of the projector 1 includes an image information selection section 71 and the power supply control section 72.

The image information selection section 71 is a multiplexer for selecting one piece of image information or a plurality of pieces of image information based on the control by the control section 40 from the plurality of pieces of image information input from the interface boards 10, and outputs the image information thus selected to the image information processing section 47.

The power supply control section 72 supplies the DC power converted by the power supply circuit 43 of the projector 1 to the power supply circuit 22 of the interface board 10 based on the control by the control section 40.

Then, an operation (a control method) of the projector 1 will be described.

When the interface board 10 is connected to the projector 1, and the power is applied, it becomes possible for the projector 1 to project the image based on the image information input to the input terminals of the interface board 10. Further, it is possible for the user to individually set each of the input terminals provided to the interface board 10 to an enabled state or a disabled state. Specifically, when the user performs a predetermined operation on the operation panel 42, the control section 40 instructs the image information processing section 47 to make the image projection section 48 project the menu image (an OSD image) not shown with which each of the input terminals can be set to the enabled state or the disabled state. If the menu image is displayed, it is possible for the user to set each of the input terminals to the enabled state or the disabled state by operating the operation panel 42. Here, since the input terminal set to the disabled state is excluded from the objects to be switched when switching the input terminals, it becomes possible for the user to efficiently perform the switching of the input terminals by setting the input terminal not planned to be used to the disabled state. The information set by the user, namely the information representing whether each of the input terminals is in the enabled state or in the disabled state, is stored in the storage section 41 as terminal information.

Figure 9A:
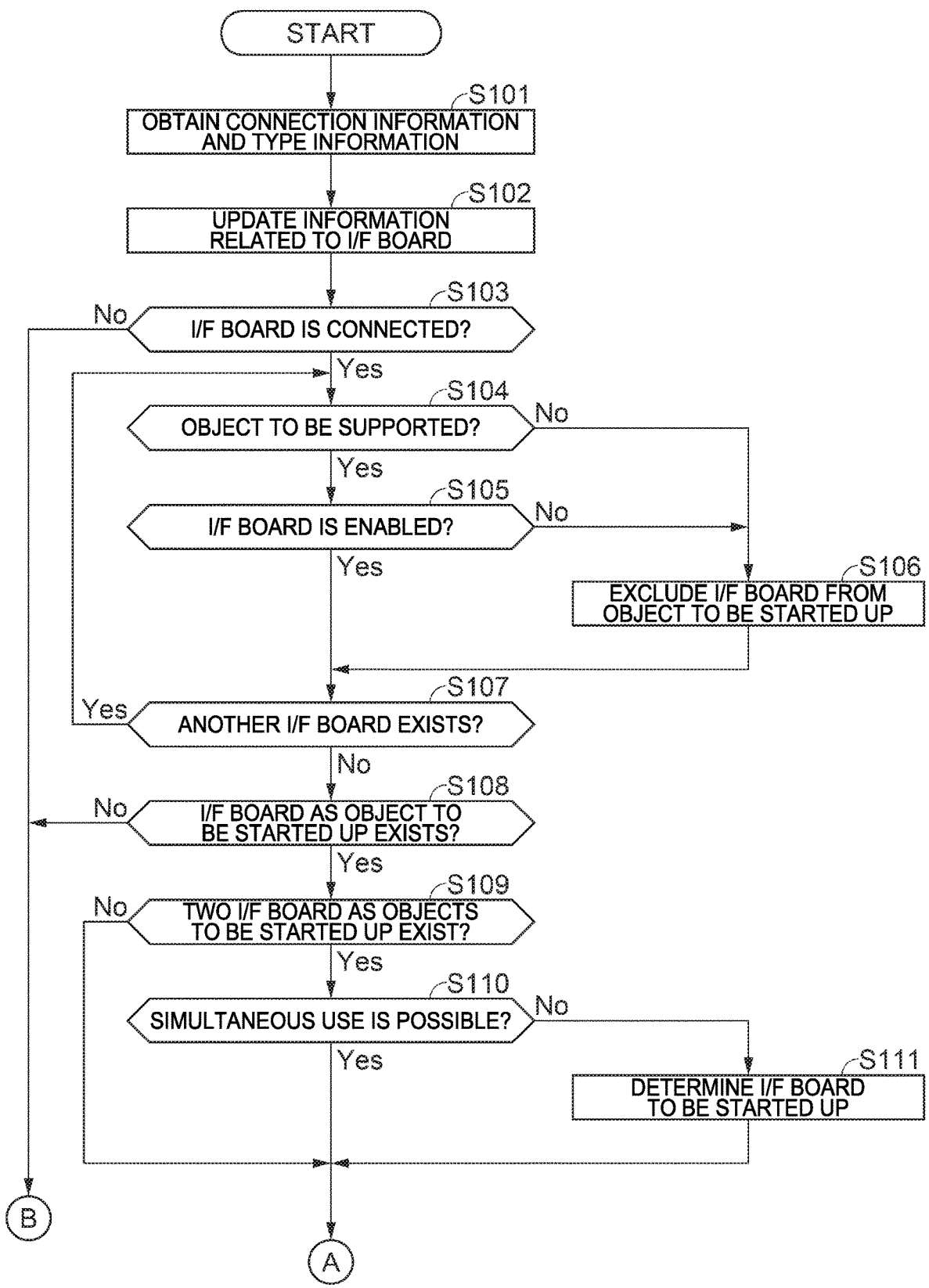
FIG. 9A is a flowchart for explaining a startup operation of the projector.
Figure 9B:
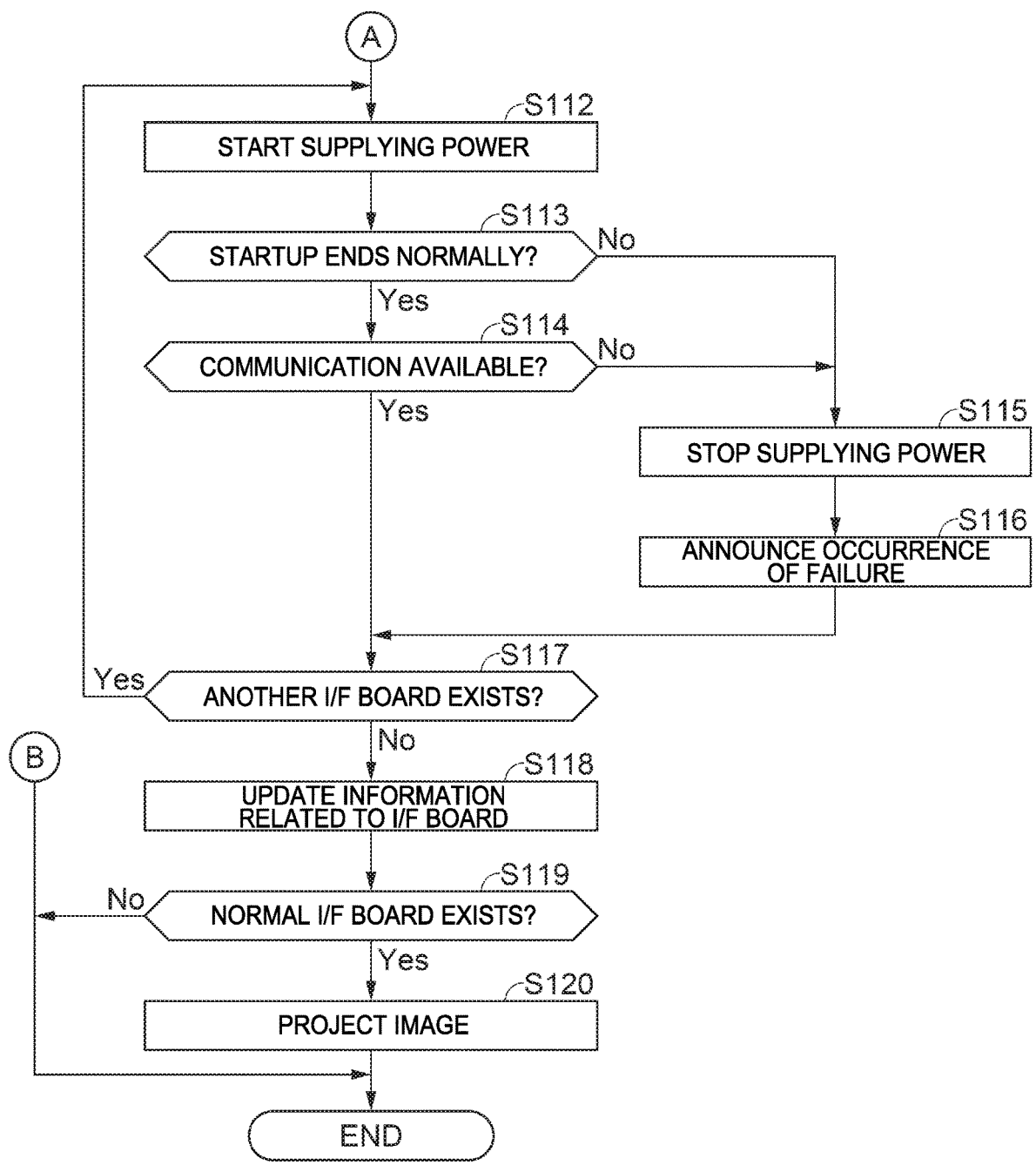
FIG. 9B is a flowchart for explaining the startup operation of the projector.
Figure 10:
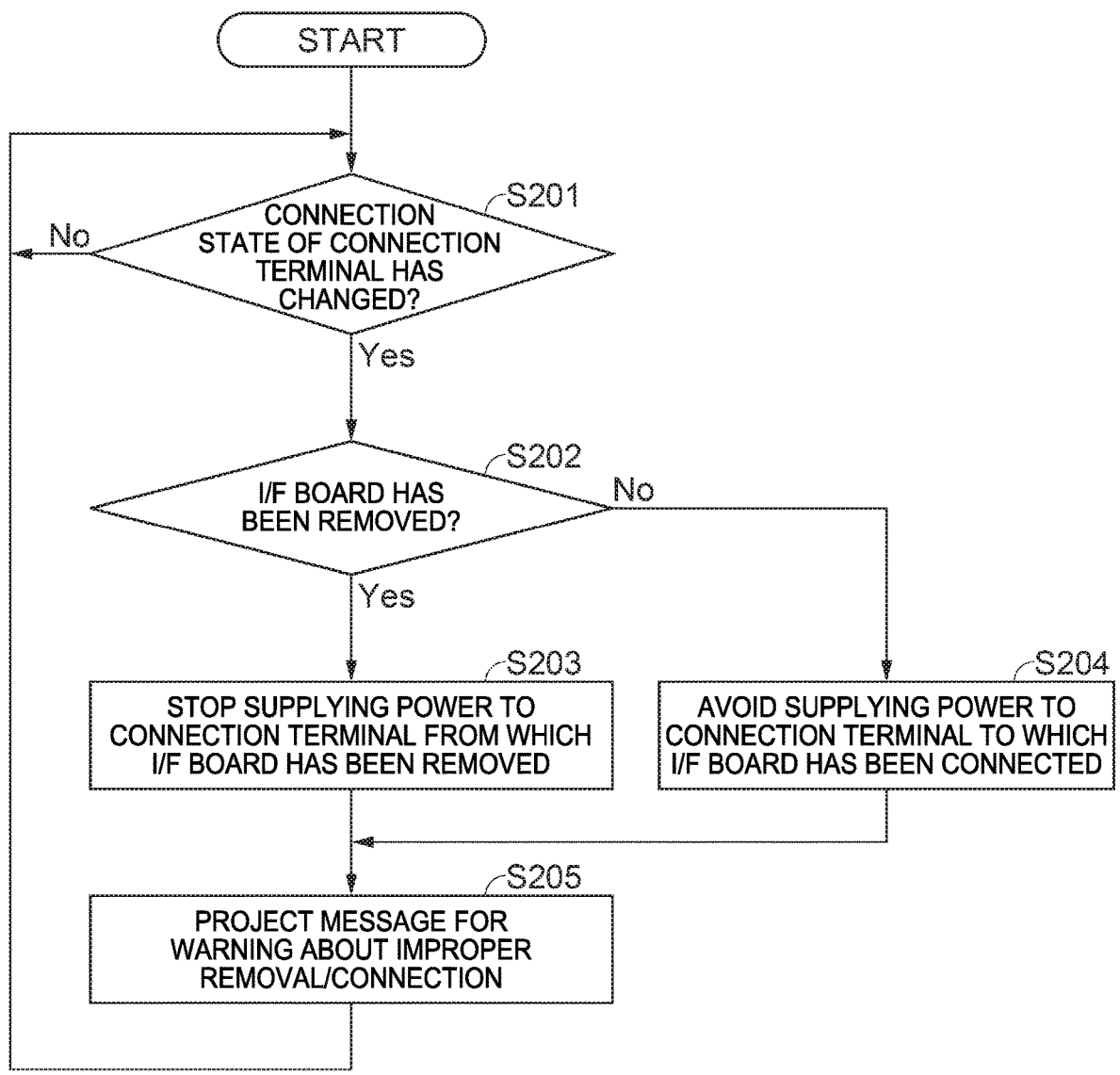
FIG. 10 is a flowchart for explaining an operation of the projector after the startup process.

FIG. 9A, FIG. 9B and FIG. 10 are flow charts for explaining the operation of the projector 1, and among these drawings, FIG. 9A and FIG. 9B show a startup operation (a startup process) of the projector 1. When the power key of the operation panel 42 is operated, the control section 40 of the projector 1 starts up, and the projector 1 operates in accordance with the flow shown in FIG. 9A and FIG. 9B. It should be noted that in FIG. 9A, FIG. 9B and FIG. 10, "interface board" is abbreviated to "I/F board."

As shown in FIG. 9A, in the step S101, the control section 40 obtains the connection information and the type information announced by the notification section 24 of each of the interface boards 10. Then, the control section 40 recognizes presence or absence of the connection of the interface board 10 to each of the connection terminals 6, and at the same time, determines the type of the interface board 10 connected.

In the step S101, the control section 40 updates interface board information stored in the storage section 41. The interface board information is information related to the interface board 10 connected to the connection terminal 6, and in the storage section 41, there is stored the interface board information updated at the previous startup. The interface board information includes information based on the connection information and the type information, namely information representing whether or not the interface board 10 is connected to each of the connection terminals 6, information representing what type of interface board 10 is connected to which connection terminal 6, and so on. The control section 40 updates the interface board information in the case in which a change occurs in presence or absence of the connection of the interface board 10, or in the type of the interface board 10 connected.

In the step S103, the control section 40 determines whether or not the interface board 10 is connected to at least one of the two connection terminals 6 based on the connection information thus obtained. Then, in the case in which the interface board 10 is connected to any of the connection terminals 6, the control section 40 makes the transition of the process to the step S104. In contrast, in the case in which the interface board 10 is connected to none of the connection terminals 6, the control section 40 instructs the image information processing section 47 to make the image projection section 48 project the OSD image (the message image) for notifying the user of the fact that the interface board 10 is not connected, and then terminates the process.

In the case in which the transition of the process to the step S104 has been made, the control section 40 determines whether or not the interface board 10 is an object to be supported based on the type information obtained from the notification section 24 with respect to one interface board 10. A list of the types of the interface boards 10 set to be the objects to be supported with respect to the use in the projector 1 is stored in the storage section 41 as support information, and the control section 40 determines whether or not the interface board 10 connected is the object to be supported with reference to the support information. Then, the control section 40 makes the transition of the process to the step S105 in the case in which the interface board 10 is the object to be supported, or makes the transition of the process to the step S106 in the case in which the interface board 10 is not the object to be supported. It should be noted that in the case in which the projector 1 is capable of stably supplying the power consumed by the interface board 10, the projector 1 takes the interface board 10 as the object to be supported.

In the case in which the interface board 10 is the object to be supported, and the transition of the process to the step S105 has been made, the control section 40 determines whether the interface board 10 is in the enabled state or in the disabled state based on the terminal information stored in the storage section 41. In the case in which at least one of the input terminals provided to the interface board 10 is set to the enabled state, the control section 40 determines that the interface board 10 is in the enabled state, and then makes the transition of the process to the step S107. In contrast, in the case in which all of the input terminals are set to the disabled state, the control section 40 determines that the interface board 10 is in the disabled state, and then makes the transition of the process to the step S106.

In the case in which the interface board 10 is not the object to be supported, or all of the input terminals are set to the disabled state, and thus the transition of the process to the step S106 has been made, the control section 40 excludes the interface board 10 from the object to be started up, and then makes the transition of the process to the step S107. It should be noted that the interface board 10 excluded from the objects to be started up is not supplied with the power from the projector 1, while the interface board 10 not excluded from the objects to be started up is supplied with the power from the projector 1 afterward.

In the step S107, the control section 40 determines whether or not another interface board 10 is connected. Then, in the case in which another interface board 10 is connected, the control section 40 returns the process to the step S104 to repeat the operation of the steps S104 through S106 for the next interface board 10. In contrast, in the case in which no other interface board 10 is connected, the control section 40 makes the transition of the process to the step S108.

In the step S108, the control section 40 determines whether or not there exist one or more interface boards 10 which are the objects to be started up. Further, in the case in which there exist one or more interface boards 10 which are the objects to be started up, the control section 40 makes the transition to the step S109. In contrast, in the case in which none of the interface boards 10 is the object to be started up, the control section 40 instructs the image information processing section 47 to make the image projection section 48 project the OSD image (the message image) for notifying the user of the fact that there exists no interface board 10 which is the object to be started up, and then terminates the process.

In the case in which the transition of the process to the step S109 has been made, the control section 40 determines whether or not there exists a plurality of (two) interface boards 10 which are the objects to be started up. Then, the control section 40 makes the transition of the process to the step S110 in the case in which there exist two, or makes the transition of the process to the step S112 (see FIG. 9B) in the case in which there exists just one.

In the case in which the transition of the process to the step S110 has been made, the control section 40 determines whether or not it is possible to use the two interface boards 10 which are the objects to be started up at the same time. A table of combinations of the interface boards 10 which can be used at the same time based on the power consumption of each of the interface boards 10 is stored in advance in the storage section 41 as combination information, and the control section 40 determines whether or not the two interface boards 10 connected thereto can be used at the same time based on the combination information. Then, the control section 40 makes the transition of the process to the step S112 (see FIG. 9B) in the case in which the simultaneous use is possible, or makes the transition of the process to the step S111 in the case in which the simultaneous use is not possible.

In the case in which the simultaneous use of the two interface boards 10 is not possible and thus the transition of the process to the step S111 has been made, the control section 40 determines either one as the interface board 10 to be started up based on priority information stored in the storage section 41, and then makes the transition of the process to the step S112 (see FIG. 9B). In other words, the control section 40 excludes the other interface board 10 from the objects to be started up, and does not supply the power. The priority information is information representing the priority of the interface board 10 of each of the types, and is stored in advance in the storage section 41. The priority represented by the priority information can be arranged to arbitrarily be set by the user, or can also be arranged to be determined by the control section 40 based on past results of usage.

As shown in FIG. 9B, in the step S112, the control section 40 controls the power supply control section 72 to start supplying the power to one of the interface boards 10 which are the objects to be started up.

In the step S113, the control section 40 determines whether or not the interface board 10 has normally started up, namely whether or not the startup success information representing the fact that the normal startup has been achieved has been transmitted from the control signal communication section 23 of the interface board 10. Then, the control section 40 makes the transition of the process to the step S114 in the case in which the startup success information has been received from the interface board 10, or makes the transition of the process to the step S115 in the case in which the startup success information has not been received, namely in the case in which a failure occurs in the power supply of the interface board 10.

In the case in which the interface board 10 has normally started up, and thus the transition of the process to the step S114 has been made, the control section 40 determines whether or not to be able to normally communicate with the interface board 10. Specifically, the control section 40 transmits a predetermined control signal to the interface board 10, and then determines whether or not communication success information representing the fact that the control signal has normally been received has been transmitted from the interface board 10 as a response to the predetermined control signal. Then, the control section 40 makes the transition of the process to the step S117 in the case in which the communication success information has been received, namely in the case in which the normal communication is possible, or makes the transition of the process to the step S115 in the case in which the communication success information has not been received, namely in the case in which a failure occurs in the communication function of the interface board 10.

In the case in which the failure has been detected in at least one of the power supply and the communication function of the interface board 10, and thus the transition of the process to the step S115 has been made, the control section 40 controls the power supply control section 72 to stop supplying the power to the interface board 10. It should be noted that in the case in which the interface board 10 to which the power supply has already started, and in which no failure is detected is connected other than the interface board 10 in which the failure has been detected, the control section 40 does not stop, but continues the power supply to this interface board 10. In other words, in the state in which the two interface boards 10 are connected to the connection terminals 6, in the case in which a failure has been detected in either one of the interface boards 10, the control section 40 stops supplying the power to the one interface board 10 in which the failure has been detected, but does not stop supplying the power to the other interface board 10.

In the step S116, the control section 40 instructs the image information processing section 47 to make the image projection section 48 project the OSD image (the message image) for notifying the user of the fact that the failure occurs in the interface board 10, and then makes the transition of the process to the step S117.

In the step S117, the control section 40 determines whether or not there exists another interface board 10 which is the object to be started up. Then, in the case in which there exists another interface board 10 which is the object to be started up, the control section 40 returns the process to the step S112 to repeat the operation of the steps S112 through S116 for the other interface board 10. In contrast, in the case in which there exists no other interface board 10 which is the object to be started up, the control section 40 makes the transition of the process to the step S118.

In the step S118, the control section 40 updates the interface board information stored in the storage section 41. Specifically, the control section 40 stores the information representing presence or absence of the failure of the interface board 10 in the storage section 41 as the interface board information in addition to the information based on the connection information and the type information having already been stored. It should be noted that it is also possible for the interface board information to include the terminal information representing whether each of the input terminals of the interface board 10 is in the enabled state or in the disabled state. Further, it is also possible for the control section 40 to obtain version information or the like of firmware of the interface board 10 from the interface board 10, and then store the version information or the like as a part of the interface board information.

In the subsequent step, namely the step S119, the control section 40 determines whether or not there exists a normal interface board 10, namely the interface board 10 which has normally started up, and the power supply to which is maintained. Then, in the case in which the normal interface board 10 exists, the control section 40 makes the transition of the process to the step S120. In contrast, in the case in which the normal interface board 10 does not exist, the control section 40 instructs the image information processing section 47 to make the image projection section 48 project the OSD image (the message image) for notifying the user of the fact that there exists no interface board 10 which can normally be used, and then terminates the process.

In the case in which the transition of the process to the step S120 has been made, the control section 40 instructs the image information selection section 71 to output the image information which is input to the input terminal selected by the input switching key of the operation panel 42 to the image information processing section 47. As a result, the image corresponding to the image information is projected on the projection surface Sp from the image projection section 48.

FIG. 10 is a flowchart for explaining the operation of the projector 1 after the startup process.

If the user performs removal or connection of the interface board 10 in the state in which the projector 1 is in operation, namely in the power ON state, there is a possibility that the projector 1 or the interface board 10 is damaged. Therefore, an instruction manual or the like of the projector 1 set forth an instruction not to perform the removal and the connection of the interface board 10 while the projector 1 is in operation. However, in case that the user unaware of this instruction performs the removal or the connection while the projector is in operation, the projector 1 monitors the removal and the connection of the interface board 10 in accordance with the flow shown in FIG. 10 after completion of the startup process described above.

As shown in FIG. 10, in the step S201, the control section 40 determines the connection state, namely whether or not there is a change in presence or absence of the connection of the interface board 10, with respect to each of the two connection terminals 6 based on the presence or absence of the connection information announced from the notification section 24 of the interface board 10. Then, the control section 40 makes the transition of the process to the step S202 in the case in which there is a change in the connection state, or repeats the present step in the case in which there is no change in the connection state.

In the case in which the change has occurred in the connection state of the connection terminal 6, and thus the transition of the process to the step S202 has been made, the control section 40 determines whether the change in the connection state is the removal of the interface board 10 from the connection terminal 6 or the connection of the interface board 10 to the connection terminal 6. Then, the control section 40 makes the transition of the process to the step S203 in the case in which the change in the connection state is the removal of the interface board 10, or makes the transition of the process to the step S204 in the case in which the change in the connection state is the connection of the interface board 10. For example, the control section 40 determines that the interface board 10 having been connected has been removed in the case in which the notification of the connection information from the notification section 24 has stopped, or determines that the interface board 10 has been connected in the case in which the notification of the connection information has started via the connection terminal 6 to which no interface board 10 has been connected.

In the case in which the interface board 10 has been removed, and thus the transition of the process to the step S203 has been made, the control section 40 controls the power supply control section 72 to stop supplying the power to the connection terminal 6 from which the interface board 10 is removed. It should be noted that in the case in which the interface board 10 having already been supplied with the power has been connected to the other connection terminal 6, the control section 40 continues to supply the power to this interface board 10. In other words, in the state in which the two interface boards 10 are respectively connected to the connection terminals 6, in the case in which either one of the interface boards 10 has been removed while the projector 1 is in operation, the control section 40 stops supplying the power to the one interface board 10 having been removed, but does not stop supplying the power to the other interface board 10.

In contrast, in the case in which the interface board 10 has been connected to the connection terminal 6, and thus the transition of the process to the step S204 has been made, the control section 40 controls the power supply control section 72 not to start supplying the power to the interface board 10 thus connected. In other words, the control section 40 makes the power supply control section 72 avoid the power supply to the connection terminal 6 to which the interface board 10 has newly been connected. It should be noted that in the case in which the interface board 10 having already been supplied with the power has been connected to the other connection terminal 6, the control section 40 continues to supply the power to this interface board 10. In other words, in the state in which one interface board 10 is connected to either one of the connection terminals 6, in the case in which the second interface board 10 has been connected while the projector 1 is in operation, the control section 40 stops supplying the power to the second interface board 10, but does not stop supplying the power to the first interface board 10.

Subsequently, in the step S205, the control section 40 instructs the image information processing section 47 to make the image projection section 48 project the OSD image (the message image) for warning the user about the fact that an improper removal or connection of the interface board 10 has been made, and then returns the process to the step S201.

As described hereinabove, according to the projector 1 and the method of controlling the same of the present embodiment, the following advantages can be obtained.

(1) According to the present embodiment, in the case in which a failure has been detected in the interface board 10 connected, the control section 40 stops supplying the power to the interface board 10. Therefore, it is possible to avoid continuing to supply the power to the interface board 10 having an abnormality.

(2) According to the present embodiment, in the state in which the two interface boards 10 are respectively connected to the connection terminals 6, in the case in which a failure has been detected in either one of the interface boards 10, the control section 40 stops supplying the power only to this interface board 10, but does not stop supplying the power to the other interface board 10. Therefore, it is possible to avoid the case in which the failure in one interface board 10 makes the other interface board 10 unavailable.

(3) According to the present embodiment, since the control section 40 detects the failure in the power supply of the interface board 10 based on presence or absence of the startup success information transmitted from the interface board 10, it is possible to avoid continuing to use the interface board 10 having an abnormality in the power supply.

(4) According to the present embodiment, since the control section 40 detects the failure in communication of the interface board 10 based on presence or absence of the communication success information transmitted from the interface board 10, it is possible to avoid the communication failure with other circuits in the projector 1, and it becomes possible to continue the normal operations of other circuits.

(5) According to the present embodiment, in the case in which the control section 40 has detected the failure in the interface board 10, the control section 40 makes the image information processing section 47 display the OSD image to announce the fact. Therefore, it becomes possible to make the user recognize the fact that the failure has occurred.

(6) According to the present embodiment, in the case in which the interface board 10 has been connected or removed despite the projector 1 is in operation, the supply of the power to the interface board 10 is stopped. Therefore, it is possible to avoid the case in which the interface board 10 is used in the state in which the interface board 10 has improperly been connected or removed.

(7) According to the present embodiment, in the state in which one interface board 10 is connected to either one of the connection terminals 6, in the case in which the second interface board 10 has been connected to the connection terminal 6 despite the projector 1 is in operation, the control section 40 stops supplying the power to the second interface board 10, but does not stop supplying the power to the first interface board 10. Therefore, it is possible to prevent the first interface board 10 from also becoming unavailable.

(8) According to the present embodiment, in the state in which the two interface boards 10 are respectively connected to the connection terminals 6, in the case in which one of the interface boards 10 has been removed from the connection terminal 6 despite the projector 1 is in operation, the control section 40 stops supplying the power to the connection terminal 6 from which the interface board 10 has been removed, but does not stop supplying the power to the other of the interface boards 10. Therefore, it is possible to prevent the other of the interface boards 10 from also becoming unavailable.

(9) According to the present embodiment, in the case in which the control section 40 has detected the connection or the removal of the interface board 10 while the projector 1 is in operation, the control section 40 makes the image information processing section 47 display the OSD image to announce the fact. Therefore, it becomes possible to make the user recognize the fact that the connection and the removal of the interface board 10 while the projector 1 is in operation are prohibited operations.

It should be noted that in the present embodiment, the control section 40 in the case of detecting the failure of the interface board 10 connected thereto based on presence or absence of the startup success information and the communication success information transmitted from the control signal communication section 23 of the interface board 10 in the steps S114, S114 corresponds to a failure detection section. Further, the control section 40, the image information processing section 47 and the image projection section 48 in the case of informing the user of the fact that the failure occurs in the interface board 10 using the OSD image (the message image) in the step S116 correspond to an announcing section. Further, the control section 40 in the case of detecting the change in the connection state of the connection terminals 6 in the step S201 corresponds to an attachment/detachment detection section.

Modified Examples

Further, the embodiment described above can also be modified as follows.

In the present embodiment, in the case in which the two interface boards 10 are connected to the projector 1, in the case in which a failure occurs in one of the interface boards 10 but the other of the interface boards 10 is normal, the control section 40 supplies the power only to the other of the interface boards 10 to continue the operation of the projector 1. However, this configuration is not a limitation. It is also possible for the control section 40 to stop the operation of the projector 1 in the case in which a failure occurs in either one of the interface boards 10. Further, it is also possible to arrange that it is possible for the user to set whether to continue the operation or to stop the operation in the case in which a failure exists in either one of the interface boards 10.

Similarly, in the embodiment described above, it is arranged that in the case in which the interface board 10 has been removed or connected while the projector 1 is in operation, the power supply to the interface board 10 having been removed or connected is stopped and the power supply to the other interface board 10 is continued. However, this configuration is not a limitation. It is also possible for the control section 40 to stop the operation of the projector 1 in the case in which the interface board 10 has been removed or connected while the projector 1 is in operation. Further, it is also possible to arrange that it is possible for the user to set whether to continue the operation or to stop the operation in the case in which the improper removal or connection has been performed.

In the embodiment described above, at the startup of the projector 1, it is possible for the control section 40 to recognize the connection state of the interface board 10 at the previous startup based on the interface board information stored in the storage section 41. Further, it is possible for the control section 40 to detect the interface board 10 having newly been connected this time, namely the interface board 10 having newly been connected in the standby state or the power OFF state before the current startup by comparing the connection state between last time and this time. In this case, it is also possible for the control section 40 to start supplying the power to the interface board 10 having continuously been connected since last time while not starting the power supply to the interface board 10 having newly been connected. Further, it is also possible for the control section 40 to make the image information processing section 47 project the OSD image (the message image) to inform the user of the fact that the new interface board 10 has been connected, and then start the power supply after the confirmation of the user is obtained.

In the embodiment described above, in the case of determining whether or not the interface board 10 is the object to be supported in the step S104, it is also possible for the control section 40 to make the determination based on the version information of the firmware of the interface board 10 together with the type information of the interface board 10.

In the embodiment described above, the control section 40 is arranged to stop supplying the power to the interface board 10 having been excluded from the objects to be started up, or the interface board 10 having failed to normally start up or communicate. However, it is also possible to supply minimal power providing the power supply is limited.

In the embodiment described above, the interface panel 44 is not provided with the input terminal for inputting the image information, and it is arranged that the image information is input via the input terminals of the interface board 10, but this configuration is not a limitation. It is also possible to adopt a configuration in which, for example, some input terminals are provided to the interface panel 44 in advance, and other input terminals can be added using the interface board 10.

In the embodiment described above, it is also possible to arrange that the control section 40 displays the information representing the type of the interface board 10 connected thereto, and the version information and so on of the firmware of the interface board 10 as the OSD image, or outputs such information from the communication section 45 to an external device in the case in which the user performs a predetermined operation to the operation panel 42.

Further, in the case in which the projector 1 is connected to a network, in the case in which the version of the firmware of the interface board 10 connected to the projector 1 is not the latest, it is also possible for the control section 40 to display a method for obtaining the latest firmware and so on as the OSD image, or to automatically download the latest firmware from a server to upgrade the version. Similarly, regarding the firmware (the control program) of the projector 1, it is also possible to inform the user of a method of obtaining the firmware suitable for the type, the version, or the like of the interface board 10 connected, or it is also possible for the control section 40 to automatically download the appropriate firmware to upgrade the version.

In the embodiment described above, it is also possible for the control section 40 to control the power supply to the circuits (e.g., the image information processing section 47) in the posterior stage in accordance with the type of the interface board 10 thus determined. Specifically, in the case in which it is not necessary to perform a process by a specific circuit block on the image information input from the interface board 10 connected, it is possible to stop supplying the power to that circuit block. For example, in the case in which the image information processing section 47 is provided with a circuit block for performing a process only on the image information input from a specific interface board 10, in the case in which the specific interface board 10 is not connected, it becomes possible to suppress wasted power consumption by stopping the power supply to this circuit block.

In the embodiment described above, in the case in which there is the insertion slot 55 in which the interface board 10 is not inserted out of the two insertion slots 55 of the interface panel 44, it is desirable to close the insertion slot 55 with a cover member in order to prevent dust and a foreign matter from entering the inside through the insertion slot 55.

Figure 11:
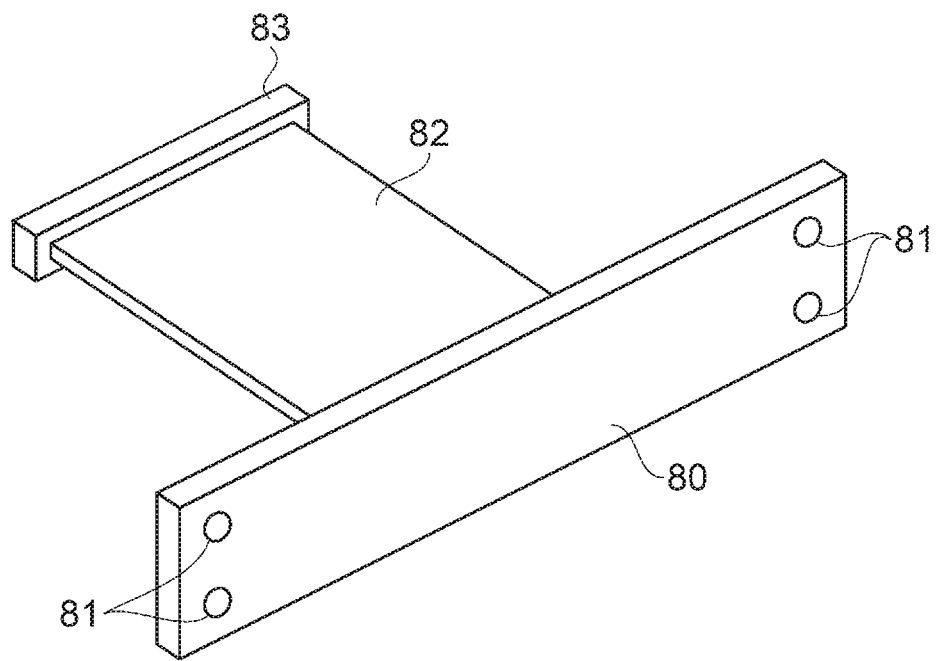
FIG. 11 is a perspective view showing an example of a cover member.

FIG. 11 is a perspective view showing an example of the cover member. As shown in FIG. 11, the cover member 80 is formed of, for example, a plate-like member made of metal or resin, and is provided with through holes 81 to be screwed to the screw holes 56 of the interface panel 44 formed on both of the right and left sides of the cover member 80. Further, to the cover member 80, there is fixed a terminal cover 83 via an extension member 82. The terminal cover 83 is arranged to cover the connection terminal 6 on the relay board 5 in the state in which the insertion slot 55 is blocked by the cover member 80. Therefore, by closing the insertion slot 55 with such a cover member 80, it becomes possible to prevent the dust and so on from entering the inside from the insertion slot 55, and at the same time to prevent corrosion or the like of the connection terminal 6.

Although in the embodiment described above, the interface board 10a provided with the single DVI terminal 15 and the two HDMI terminals 16 and the interface board 10b provided with the four SDI terminals are shown as the examples of the interface board 10, the types and the number of the input terminals provided to the interface board 10 are not limited to those described above. Further, the input terminals provided to the interface board 10 are not limited to the input terminals for inputting the digital image information, but can also be input terminals for inputting analog image information.

In the embodiment described above, the interface board 10 is not limited to the configuration provided with the input terminal to which the image information is input. It is also possible for the interface board 10 to have, for example, a configuration provided with connection terminals for communication such as a LAN terminal, a USB terminal or an RS-232C terminal, or connection terminals for control. In this case, the communication section 45 functions as the connection section, and the interface board 10 is connected to the communication section 45. Then, it becomes possible for the communication section 45 to perform transmission and reception of the control information and so on with the external device via the interface board 10. By adopting such a configuration, it becomes possible to transmit and receive the control information in a variety of formats by adding or replacing the interface board 10.

The control section 40 determines the type of the interface board 10 based on the bit string output from the notification section 24 of the interface board 10 in the embodiment described above, but the determination method of the type is not limited thereto. It is also possible to arrange that, for example, a storage device such as a ROM storing the type information is provided to the interface board 10, and the control section 40 retrieves the type information from the storage device.

In the embodiment described above, the interface board 10 is arranged to convert the image information input to the input terminal into the image information compliant with the TMDS protocol. However this configuration is not a limitation, and it is also possible to convert the image information into image information compliant with other standards or an own standard.

In the embodiment described above, the interface board 10 is not limited to the configuration of being connected to the external device with wire via the input terminals (the connection terminals), but can also be a configuration of being wirelessly connected to the external device.

In the embodiment described above, there is shown an example in which the two interface boards 10 different in type from each other are connected to the image information input section 46, but it is also possible to use the two interface boards 10 the same in type connected to the image information input section 46.

Although the configuration in which the two interface boards 10 can be connected is shown in the embodiment described above, the number of the interface boards 10 which can be connected is not limited to two, but can also be one, or three or more.

In the embodiment described above, in the case in which the failure of the interface board 10 has been detected, or the improper removal or connection of the interface board 10 has been detected, the control section 40 makes the image projection section 48 project the OSD image (the message image) for informing the user of the fact, but this configuration is not a limitation. In the case in which, for example, the projector 1 is provided with an LED (light emitting diode) indicator or a display monitor, it is also possible to give a notification by changing the emission state of the LED indicator, or by displaying a message on the display monitor. Further, in the case in which the projector 1 is provided with a sound output device, it is also possible to give a notification by a sound.

Although in the embodiment described above the transmissive liquid crystal light valves 62R, 62G, and 62B are used as the light modulation devices, it is also possible to use reflective light modulation devices such as reflective liquid crystal light valves. Further, it is also possible to use a digital mirror device or the like for modulating the light emitted from the light source 61 by controlling the emission direction of the incident light for every micromirror as a pixel. Further, the configuration of providing the plurality of light modulation devices for the respective colored light beams is not a limitation, but it is also possible to adopt a configuration of modulating the plurality of colored light beams with a single light modulation device in a time-sharing manner.

Although in the embodiment described above, the projector 1 is described as an example of the image display device, the image display device is not limited to the projector 1, but can also be other image display devices such as a liquid crystal display or an organic EL display.

What is claimed is:

1. An image display device adapted to display an image, comprising:
   a connection section to which an interface board, which is replaceable, is connected, and which communicates with an external device via the interface board; and
   one or more processors programmed to
      detect a failure of the interface board connected to the connection section, and
      limit power supply to the interface board in response to detecting the failure of the interface board, wherein
   the one or more processors are programmed to receive status information from the interface board indicating a status of the interface board,
   the one or more processors detect the failure of the interface board in response to not receiving the status information from the interface board,
   the status information includes startup success information and communication success information,
   the one or more processors are programmed to, after receiving the startup success information from the interface board, detect the failure and limit the power supply in response to not receiving the communication success information from the interface board, and
   the one or more processors are programmed to not limit the power supply to the interface board in response to receiving the startup success information and the communication success information from the interface board.

2. The image display device according to claim 1, wherein in a state in which a first interface board as the interface board and a second interface board as the interface board are connected to the connection section, in response to detecting the failure in the first interface board but not detecting the failure in the second interface board, the one or more processors limit the power supply to the first interface board but do not limit the power supply to the second interface board.

3. The image display device according to claim 1, wherein the one or more processors are further programmed to announce that the failure of the interface board has been detected in response to detecting the failure of the interface board.

4. An image display device adapted to display an image, comprising:
   a connection section to which an interface board, which is replaceable, is connected, and which communicates with an external device via the interface board; and
   one or more processors programmed to
      detect connection of the interface board to the connection section while the image display device is in operation,
      limit power supply to the interface board in response to detecting the connection while the image display device is in operation, and
      not limit the power supply to the interface board in a case that the interface board has been connected to the connection section before startup of the image display device.

5. The image display device according to claim 4, wherein a first interface board as the interface board and a second interface board as the interface board can be connected to the connection section, and in a state in which the first interface board is connected to the connection section, in response to detecting the connection of the second interface board while the image display device is in operation, the one or more processors limit the power supply to the second interface board but do not limit the power supply to the first interface board.

6. The image display device according to claim 4, wherein the one or more processors are further programmed to announce that the connection has been detected in response to detecting the connection.

7. A method of controlling an image display device to which an interface board, which is replaceable, is connected, and which communicates with an external device via the interface board, the method comprising:

detecting a failure of the interface board connected, wherein the failure of the interface board is detected in response to not receiving status information from the interface board indicating a status of the interface board; and limiting power supply to the interface board in response to detecting the failure of the interface board, wherein the status information includes startup success information and communication success information, after receiving the startup success information from the interface board, the failure is detected and the power supply is limited in response to not receiving the communication success information from the interface board, and the power supply to the interface board is not limited in response to receiving the startup success information and the communication success information from the interface board.

* * * * *